United States Patent [19]

Tauch

[11] Patent Number: 4,477,270

[45] Date of Patent: Oct. 16, 1984

[54] AIR FILTER

[76] Inventor: Franz Tauch, 536 E. Dundee Rd., Palatine, Ill. 60067

[21] Appl. No.: 432,347

[22] Filed: Jan. 7, 1983

[51] Int. Cl.³ .............................................. B01D 50/00
[52] U.S. Cl. .................................... 55/316; 55/318; 55/413; 55/472; 55/485; 55/486; 55/492
[58] Field of Search ............... 55/316, 318, 469, 471, 55/472, 485, 486, 487, 492, 510, 528, 529, DIG. 13, 410, 413, 414, 467

[56] References Cited

U.S. PATENT DOCUMENTS

| 2,562,839 | 7/1951 | Winston | 55/316 |
| 3,144,315 | 8/1964 | Hunn | 55/486 |
| 3,577,710 | 5/1971 | Feldman | 55/529 |
| 4,073,631 | 2/1978 | Brady et al. | 55/471 |
| 4,339,250 | 7/1982 | Thut | 55/316 |

Primary Examiner—David L. Lacey

[57] ABSTRACT

An air filter providing a filter chamber comprising an open core cage of activated charcoal wrapped by a first polyurethane foam pad of a predetermined density, all of which is covered by a second polyurethane filter blanket of a different density. The center bore of the chamber being unobstructed and having communication at one end with an air blower that evacuates the core, drawing ambient air therein through 360 degrees and exhausting filtered air therefrom.

8 Claims, 5 Drawing Figures

AIR FILTER

SUMMARY OF THE INVENTION

It is an object of this invention to provide an air filter that is highly efficient in use, economical to manufacture, and simple to maintain.

Another object of the invention is to provide an air filter which draws polluted ambient air through a full 360 degree area surrounding an open core. The unit will evacuate the center of the open core creating a pressure differential attracting polluted air through the filtering walls and exhaust the purified air through the base of the unit.

The air filter of the present invention consists of a circular frame which provides a cage for activated charcoal. The charcoal cage is first wrapped by a polyurethane foam blanket which in turn is wrapped by an outer polyurethane foam blanket having a density different from that of the first blanket.

The filtering properties and characteristics of polyurethane foam is well known in the art, and together with its low resistance to air transmission with the ability to absorb twice its own weight in contaminants makes the two-stage filtering of this invention highly efficient in use.

The air filter of the present invention utilizes a vacuum system which functions together with atmospheric pressure, and electromotive forces to draw contaminated air through the three-stage filter of the unit through the use of a minimal amount of energy, all of which is a direct result of the air diffuser and blower assembly incorporated in this invention.

Other objects of this invention will be apparent from the description hereinafter incorporated in this specification.

BRIEF DESCRIPTION OF THE DRAWINGS

The invention will be best understood by reference to the accompanying drawings showing the preferred form of the embodiment by which the stated objects of the invention are achieved, and in which.

GENERAL DESCRIPTION

Figure 1:
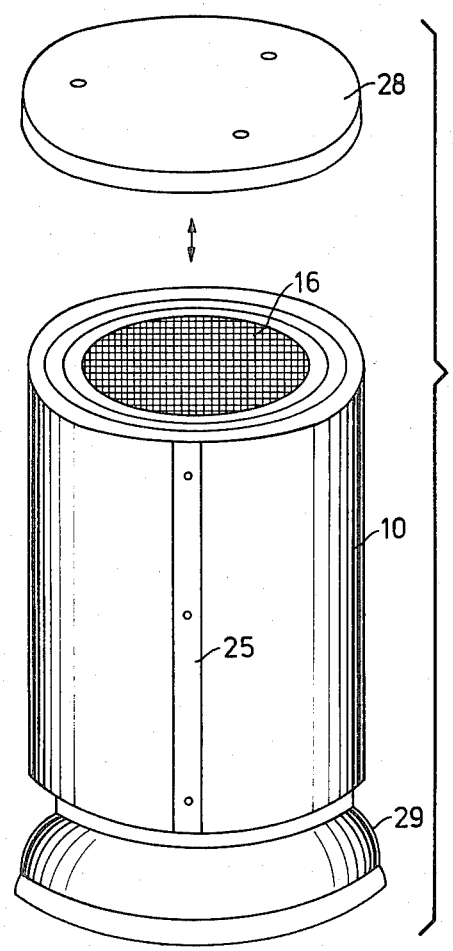
FIG. 1 is a side elevational perspective view of the filter unit of this invention.
Figure 2:
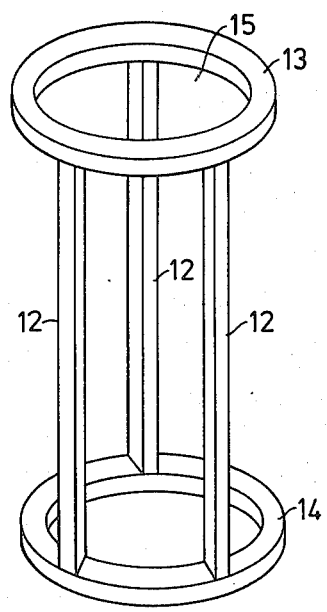
FIG. 2 is a side elevational perspective view of the internal frame of the filter unit

The air filter of this invention is designed and constructed so that it may be housed in either a vertical or horizontal exterior cabinet. As the design of the cabinet is merely incidental to the invention, it is not shown in the drawings or described in the definition of the invention.

The air filter 10 of the invention is shown in a vertical displacement in FIG. 1.

The air filter 10 consists of an internal frame 11 having elongated standards 12, all of which are joined together by circular top and bottom rings 13 and 14 respectively. The construction of the frame 11 is designed to provide an open center core 15 defined by a wall of screening 16 attached to the inner wall surface of the standards 12 and connecting rings 13 and 14, see FIGS. 3 and 4.

A like circular wall of screening 17 is fastened about an outer periphery of the frame 11 forming, together with the inner screen wall 16, an open cage 18 for retaining a quantity of activated charcoal 19. The activated charcoal comprises one filter stage of the three-stage filters of this invention.

Figure 3:
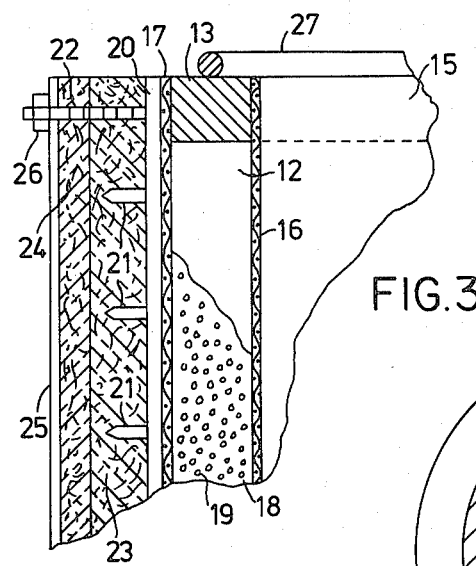
FIG. 3 is an enlarged detailed sectional view of the three-stage filter system of this invention.

An elongated connector strip 20 overlays the outer screen wall 17 and extends between the top and bottom rings 13 and 14 and lies adjacent one of the standards 12 as shown in FIG. 3.

This connector strip 20 provides a series of vertical staggered pins 21 extending radially with respect to the center core 15, as well as a plurality of threaded bolts 22. Adapted to be impinged upon the pins 21 are the mating edges of a blanket of polyurethane 23 having a density of approximately 80 ppi.

Adapted to encase the charcoal cage 18, as well as the polyurethane blanket 23, is a second blanket 24 of polyurethane having a density of approximately 45 ppi.

The threaded bolts 22 are of a length so as to project outwardly of the blanket 24 and receive a closure strip 25 which covers the mating edges of the blanket 24 and retain the same in their designated position relative to the frame 11. By a series of fasteners such as nuts 26 the strip 25 is secured in place.

The top ring 13 is provided with a circular sealing gasket 27, which, together with a circular cover 28, will effectively seal the top of the center core 15. The cover 28 may be fastened to the ring 13 by any suitable means, such as screws or the like.

Figure 4:
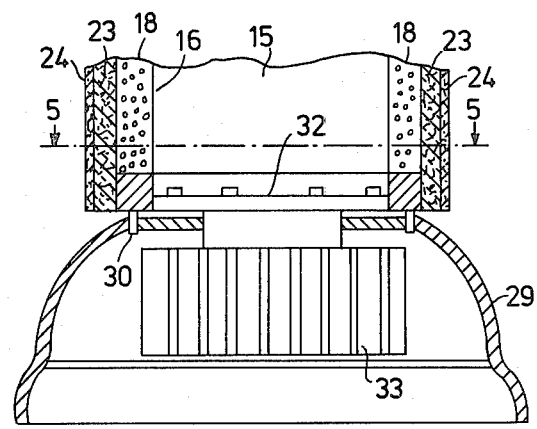
FIG. 4 is a fragmentary detailed sectional view of the air diffuser and blower assembly as employed in this invention.
Figure 5:
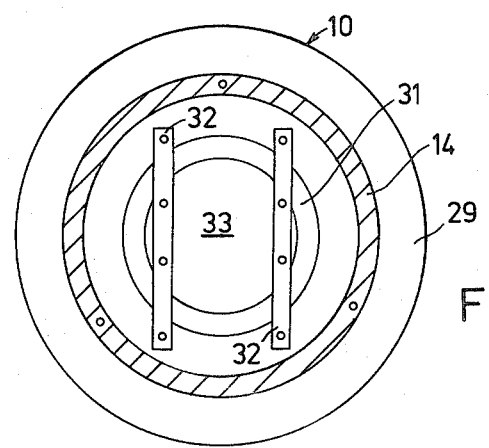
FIG. 5 is a top plan sectional view taken on lines 5—5 of FIG. 4.

Mounted upon the bottom ring 14 exteriorly of the frame 11 is an air diffusing shield 29. This shield may be connected to the bottom ring 14 by any suitable fasteners such as by screws 30 as shown in FIG. 4. The shield 29 provides a circular opening 31 which is of a diameter slightly less than that of the ring 14 and is positioned so as to have open communication with the center core 15. Across the top of the opening 31 of the shield 29 are a pair of mounting bars 32 which, in turn, support therefrom, in a depending fashion, within the shield 29, an air blower 33.

When the air filter unit 10 is positioned within its receptacle, the shield 29 will be in an elevated position so as to have open communication with the surrounding atmosphere. When the blower 33 is activated it will evacuate the air within the center core 15 creating a vacuum therein which, in turn, will be force filled by ambient air surrounding the filter 10. This ambient polluted air will be filtered as it is drawn through the three-stage filters of the unit into the center core 15 and exhausted as cleansed and purified air through the diffuser shield 29.

By creating a vacuum within the center core 15, which is sought to be filled by the ambient atmosphere entering through 360°, the air movement is powerful enough to draw the contaminated air through each successive increased density of the three-stage filters consisting of the outer foam blanket 24, the inner foam blanket 23, and the activated charcoal 19. The air contaminants are readily trapped and filtered by this arrangement resulting in an efficient and economical air purification operation.

While I have illustrated and described the preferred form of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

Having thus described the invention, what I claim as new and desire to secure by Letters Patent is:

1. A filter for purifying air having a plurality of filter stages comprising:
   (a) a frame means having an open center core having opposite open ends,
   (b) means for sealing one of said open ends of said center core,
   (c) cage means mounted on said frame within said center core for holding a granular filter material,
   (d) a granular filter material contained within said cage means,
   (e) a first filter blanket, wrapped around the exterior of said cage means and having a pre-determined density,
   (f) a second filter blanket having a lesser density covering said first filter blanket,
   (g) an air diffuser mounted on said frame at its remaining open end and having communication with said center core, and
   (h) an air evacuating means within said air diffuser for evacuating air from within said center core through said open end of said frame means so as to create a vacuum within said center core which will be filled by filtered air drawn through said filter elements through a 360° plane.

2. A filter for purifying air as defined by claim 1, wherein said granular filter material comprises a quantity of activated charcoal retained within said cage means surrounding said center core of said frame.

3. A filter for purifying air as defined by claim 1, wherein said first filter blanket is a polyurethane foam having a density of 80 ppi. and the second filter blanket comprises a polyurethane foam having a density of 45 ppi.

4. A filter for purifying air as defined by claim 3, wherein said granular filter material comprises a quantity of activated charcoal retained within said cage means surrounding said center core of said frame means.

5. A filter for purifying air as defined by claim 1 wherein said cage means comprises spaced apart walls formed from a suitable wire mesh extending about said open center core.

6. A filter for purifying air as defined by claim 5, wherein said granular filter material comprises a quantity of activated charcoal retained within said cage means surrounding said center core of said frame means.

7. A filter for purifying air as defined by claim 5, wherein said first filter blanket is a polyurethane foam having a density of 80 ppi., and the second filter blanket comprises a polyurethane foam having a density of 45 ppi.

8. A filter for purifying air as defined by claim 1, wherein said air evacuating means comprises a blower adapted to evacuate air from within said center core and exhausting the same through said air diffuser.

* * * * *